United States Patent [19]
Bennett et al.

[11] Patent Number: 5,305,610
[45] Date of Patent: Apr. 26, 1994

[54] PROCESS AND APPARATUS FOR PRODUCING NITROGEN AND OXYGEN

[75] Inventors: Douglas L. Bennett, Allentown; Keith A. Ludwig, Emmaus; Robert F. Weimer, Allentown, all of Pa.

[73] Assignee: Air Products and Chemicals, Inc., Allentown, Pa.

[21] Appl. No.: 573,922

[22] Filed: Aug. 28, 1990

[51] Int. Cl.⁵ .............................. F25B 9/02
[52] U.S. Cl. .............................. 62/5; 62/11
[58] Field of Search .............................. 62/5, 11

[56] References Cited

U.S. PATENT DOCUMENTS

| | | | |
|---|---|---|---|
| 1,952,281 | 3/1934 | Ranque | 62/5 |
| 2,548,377 | 4/1951 | Kapitza | 62/11 |
| 2,861,431 | 1/1958 | Deemter | 62/5 |
| 2,894,371 | 7/1959 | Auer et al. | 62/5 |
| 2,907,174 | 10/1959 | Hendal | 62/11 |
| 3,296,807 | 1/1967 | Fekete | 62/5 |
| 3,775,988 | 12/1973 | Fekete | 62/23 |

FOREIGN PATENT DOCUMENTS

82/01242 4/1982 U.S.S.R.

*Primary Examiner*—Donald P. Walsh
*Assistant Examiner*—Daniel Jenkins
*Attorney, Agent, or Firm*—Willard Jones, II; William F. Marsh; James C. Simmons

[57] ABSTRACT

The present invention is a separation process for atmospheric gases. In the process, an atmospheric gas stream, for example air, is compressed and may be partly condensed prior to introduction into a vortex tube air separator. The performance of the tube separation can be upgraded, i.e. by improving the concentration and/or purity of the main oxygen stream, by enhancing the separator efficiency of the vortex tube (VT) apparatus. One approach is by selectively refrigerating the cold end of the tube with partial recycle of nitrogen gas waste stream, effecting a rectification section. Another approach is to increase the heat transfer between the outlet gas stream and the liquid film flowing along the curvilinear periphery of the separator means, by mechanical innovations in its configuration.

18 Claims, 11 Drawing Sheets

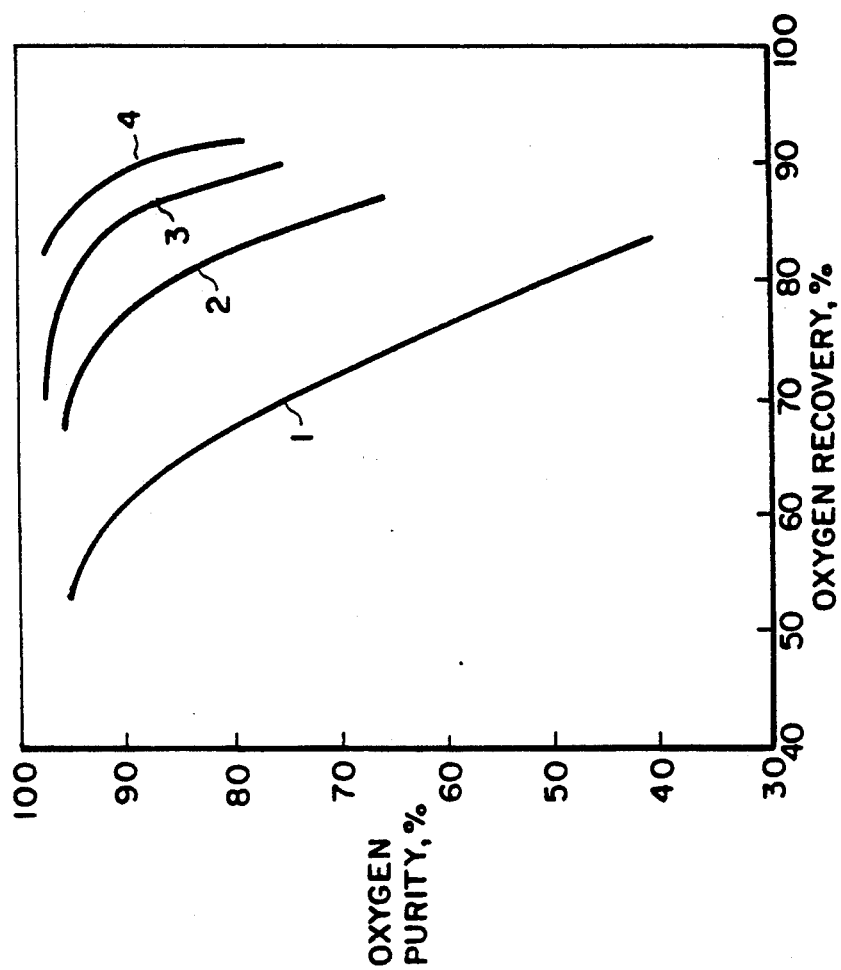

PROCESS AND APPARATUS FOR PRODUCING NITROGEN AND OXYGEN

This invention was made under United States Air Force Contract No. F33615-87-C2730 and is subject to government rights arising therefrom.

TECHNICAL FIELD

This invention relates to the art of refrigeration and to an air separation process and apparatus for improved oxygen yields and purity.

BACKGROUND OF THE INVENTION

A vortex line is a line drawn through a fluid such that it is every way tangent to the rotation vector, which aspect is parallel to the axis of rotation. A collection of vortex lines through a small closed curve defines a vortex tube, which has certain special properties. Vortex lines move with the fluid, while vorticity is a property of the fluid itself and not of the space it occupies. A smoke ring is a natural example of a closed vortex tube.

Vortex tubes have been tried as gas phase refrigerating devices since the 1930s, but only more recently are they proposed as gas-liquid separation and fractionation devices. One approach to a vortex tube air fractionator was described by Suslov et al in *Chemical and Petroleum Engineering* 16, 507 Sep.-Oct. 1980, "Development and Investigation of a New Type of Air Separation Apparatus".

Certain changes in the 1980 published article are later described in a U.S. Pat. No. 4,531,371 to the same Suslov et al. It teaches using two vortex tubes in series, but it is equivocal as to how much the $O_2$ recovery at a given purity will be improved. In any event, using multiple vortex tubes will increase the size and piping complexity of a refrigeration system. Such a trend is an inappropriate way to go for an onboard refrigeration means that is to be made adaptable to hypersonic aircraft applications.

Nonetheless, a vortex tube separator has been perceived as a viable means for producing liquid $O_2$ during hypersonic flight, predicated on major configurational changes. This auxiliary $O_2$ source could be applied as the fuel oxidant for boosting the vehicle into space orbit. On board $O_2$ generation will reduce the take-off weight if the air separation system can be made lightweight enough to meet the cost-benefit standard.

Vortex tube (VT) separators are promising as they lack moving parts, are unaffected by gravity and acceleration changes, and can process large volumes of air per unit volume and weight of apparatus. The typical configuration and flow patterns of a VT separator are shown in FIG. 1.

As seen, the separator consists of an elongated conical chamber with a tangential nozzle entrance. The chamber has a constricted end having an axial gas stream outlet opening, and on the opposing enlarged end by a diffuser ring having a liquid stream outlet. Supplemental to the air feed through the tangential inlet, the art has suggested that a recycled gas may be introduced through a perforated tube disposed along the central axis of the vortex tube.

The tangential introduction of partially condensed air sets up a two-phase vortex flow consisting of an annular film of liquid on the chamber wall and gaseous core. A liquid film is held on the wall by centrifugal forces that far exceed the effect of gravitational acceleration. Thus, operation of the VT is not effected by the changes in orientation or acceleration that will occur during hypersonic flight. As the film moves from the inlet end of the separator to the diffuser, it exchanges mass with the gaseous core and becomes enriched in oxygen. A liquid stream enriched in oxygen is withdrawn through the diffuser ring.

Two zones may be differentiated in the gaseous core. A peripheral zone in which gas flows in the same direction as the liquid film, and a central core zone in which the gas moves back towards the gas outlet, becoming enriched in nitrogen. The vortex flow is accompanied by phase separation and by development of radial and axial temperature gradients.

Still, application of a two-phase VT to air separation has been restricted due to the inability to concurrently obtain both high purity oxygen and high $O_2$ recovery rates.

SUMMARY OF THE INVENTION

According to the invention, the product purity/recovery performance of a vortex tube air separator system can be improved by selectively refrigerating the cold end of the tube, either directly or indirectly, so that the consequent colder temperatures that occur results in a change of composition, leading to a reduction in the percentage of oxygen exiting the tube cold end as part of the nitrogen-rich gaseous co-product.

In a first embodiment, the refrigerating effect is gained by condensing part of the vapor product stream, recycling the condensed liquid near to the vapor outlet end of the tube, thereby reducing the temperature through either direct injection of the cold stream to the tube, or heat exchange through the wall.

In an alternate embodiment, the liquefied, nitrogen-rich effluent stream is introduced into the cold end at a point that is somewhat spaced apart from the compressed air entry point, defining there between a rectification section in which the cold end product flow is depleted in oxygen relative to the oxygen purity of the gas in the central region of the vortex tube near the air entry point.

The direct introduction of refrigerant into the near-throat region of a vortex tube air separator is novel to the field of air separation cycles. A marked increase in oxygen recovery and product purities is thus made feasible without resort to the traditional methods of distillation, which are known to result in high purity components often required industrially.

For the hypersonic aircraft application of the present invention, liquid hydrogen is available as a refrigerant for cooling of the air feed. The special use of such source of refrigerant precludes the need for compression of the air feed beyond the level needed to operate the vortex tube itself.

Cold end refrigeration, by condensing and recycling nitrogen product to the vortex tube will allow for greater refrigeration duty since latent heat (from nitrogen gas condensation), is productively employed. Such improvement over standard vortex tube separation is what is needed to meet the requirements of an onboard oxygen generator for a hypersonic aircraft with orbital capacity.

The present process and apparatus is differentiated from state-of-the-art VT air separators by: a) an external refrigeration source being used; b) the $N_2$ gas stream being partly condensed, either externally or within the tube itself through an external refrigeration source; and c) a rectification section may be included in the tube to facilitate O$_2$ recovery.

The basic motive force for air separation in a VT is the swirling flow generated by the tangential introduction of air at near-sonic velocity rates. This creates a large pressure gradient between the axis of the tube and its curvilinear wall, with the wall being at the higher pressure.

In another embodiment, in order to minimize the total space needs for multiple vortex tubes, it is possible to stack multiple parallel tubes in a complemental staggered arrangement (cold end of one tube adjacent the warm end of a second tube). Space is provided between stacked members and at their ends for connecting piping and headers. Also, a manifolding system can be configured to reduce the spacing between tube rows, and/or to make it feasible to arrange a large number of small tubes in parallel.

Also as to this invention, the O$_2$ purity-recovery performance of a VT air separator is improved by enhancing the heat transfer between N$_2$-enriched outlet gas stream and the liquid film flowing along the curvilinear periphery of the separator means. Enhanced heat transfer rates at the tube wall cause increased internal condensation and revaporization, resulting in increased O$_2$ concentration in the outlet liquid stream at the "warm end." The key is in achieving higher heat and mass transfer rates between gas and liquid flowing at high angular velocities near the tube wall.

Such enhancement takes the form of specially configured tube wall surfaces that increase the effective "UA" specifications of the tube wall. Broadly, increases in contact area are accomplished by incorporating spiral fins or curvilinear pins into the wall surface. Alternatively, increasing the wall shear rate with an imposed surface irregularity (such as with a washboard configuration) should increase the heat transfer coefficient (U); improving either factor raises the effective UA of the tube. An alternate approach to an enhanced UA factor, is by increasing liquid film turbulence over the VT wall. The incorporation of other surface perturbations is one such mechanism.

According to the invention, there is provided a process for separating air into a nitrogen-enriched gas stream and an oxygen enriched liquid stream by introducing partly liquefied air at a pressure of 3 to 30 atmospheres, and a temperature range of 160° to 230° R into a vortex tube, at an entry point spaced apart from the nitrogen-rich stream outlet. In refrigerating the gas outlet end of the tube, preferably the refrigeration is provided from a source external to the vortex tube. In a preferred embodiment, a portion of the nitrogen-rich gas stream is condensed and recycled for introduction as a liquid into the cold end of the vortex tube, providing this desired refrigeration effect therein.

BRIEF DESCRIPTION OF THE DRAWING

FIG. 8b is a plot of liquid film flow vs. oxygen concentration along plural axial points of the tube length (L) for a vortex tube mathematical mode as shown in FIG. 8a.

FIG. 14 is a similar graph of the plot of oxygen purity vs. oxygen recovery for several cases of the surface enhancement factor, in conjunction with cold-end condensation, using a single stage external separator.

DETAILED DESCRIPTION OF THE INVENTION

The present invention in its broadest sense is a process for the separation of atmospheric air by cryogenic distillation into a waste nitrogen-rich vapor outlet stream and also into an oxygen rich liquid outlet stream.

To better understand the present advance in the art, it is helpful to compare the process of the present invention to a conventional vortex tube flow schematic for air feed to a vortex tube and to production of an oxygen liquid product as in the aforelisted U.S. Pat. No. 4,531,371. An air feed is compressed and passed through a heat exchange means wherein it transfers much of its sensible heat to the nitrogen-rich waste stream of the process. The cool air feed passes through a pressure let-down valve and into the cold end of a vortex tube separator. The separator tube produces an oxygen-rich liquid product stream and a nitrogen-rich waste gas stream, the latter being passed counter-currently back through the heat exchange means before dissipation.

Figure 1:
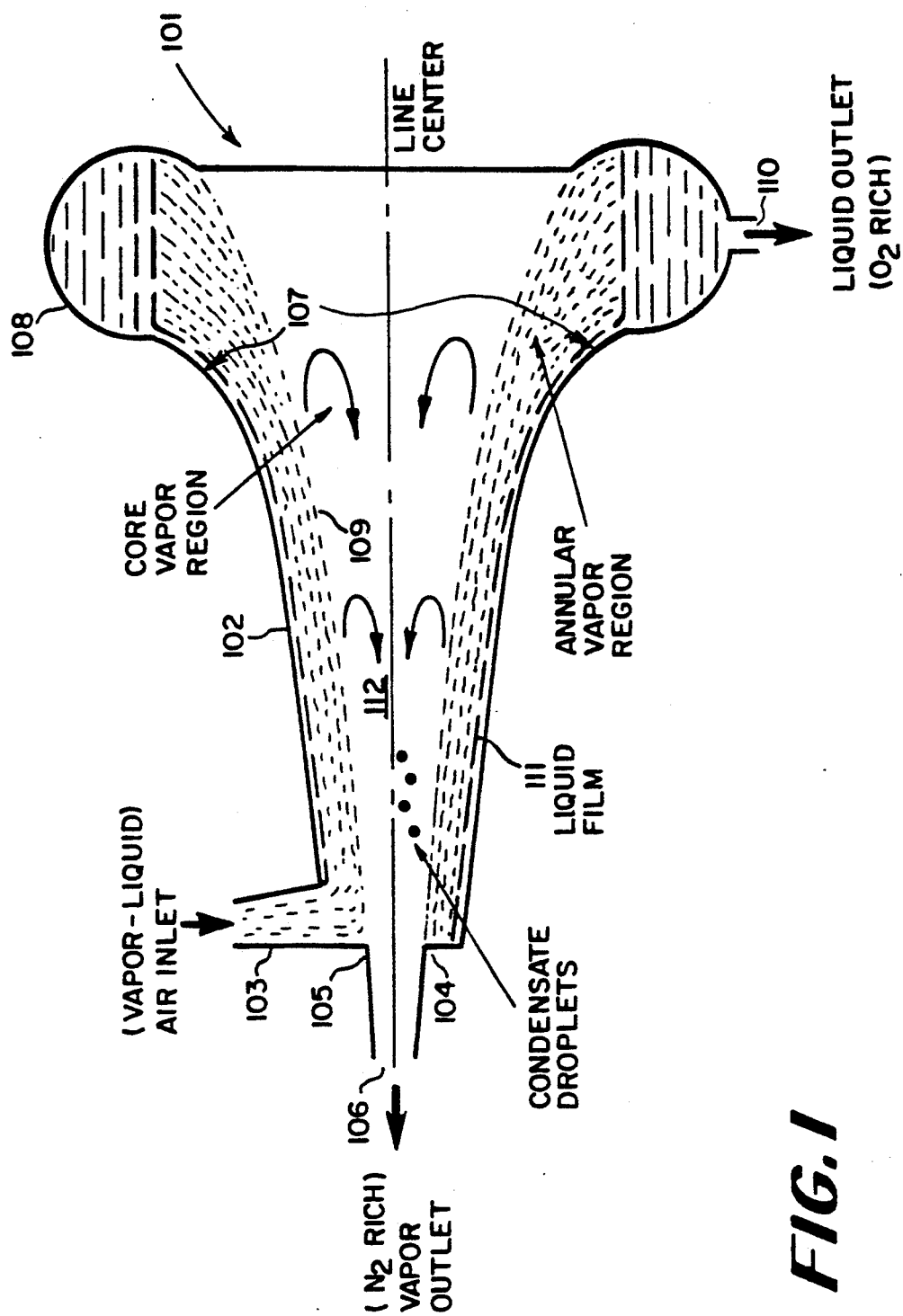
FIG. 1 is a generalized configuration depicting macroscopic gaseous-liquid flow patterns of a vortex tube of the prior art.

Referring now to FIG. 1, the macroscopic flow patterns and general configuration of a prior art vortex tube separator are shown. The separator 101 consists of a conical chamber 102 with a tangential nozzle entrance 103. Chamber 102 is bounded on one longitudinal end 104 (the more constricted end), by an exit 105 having an axial gas outlet opening 106, and on its other end by a diffuser segment 107 provided with ring-like header 108. In addition to the main two-phase (liquid/gas feed), some recycled gas from another vortex tube in series may be introduced through a perforated tube distributor (not shown), which would be disposed along the central axis.

Two fluid zones may be perceived in the gaseous core: a peripheral zone 109, in which the gas flows in the same direction as the liquid film 111, and a central zone 112, in which the gas moves back (leftwards) towards the gas outlet 106, becoming enriched in nitrogen. The vortex flow is accompanied by phase separation and by development of radial and axial temperature gradients. Heat may be added or withdrawn, preferably via the entering and exiting streams. Condensation occurs in the colder central zone (core), depleting the oxygen content of this zone as the gas flows towards the gas exit. Liquid forming in the central zone 112 is transported to the annular film by centrifugal forces.

Figure 2:
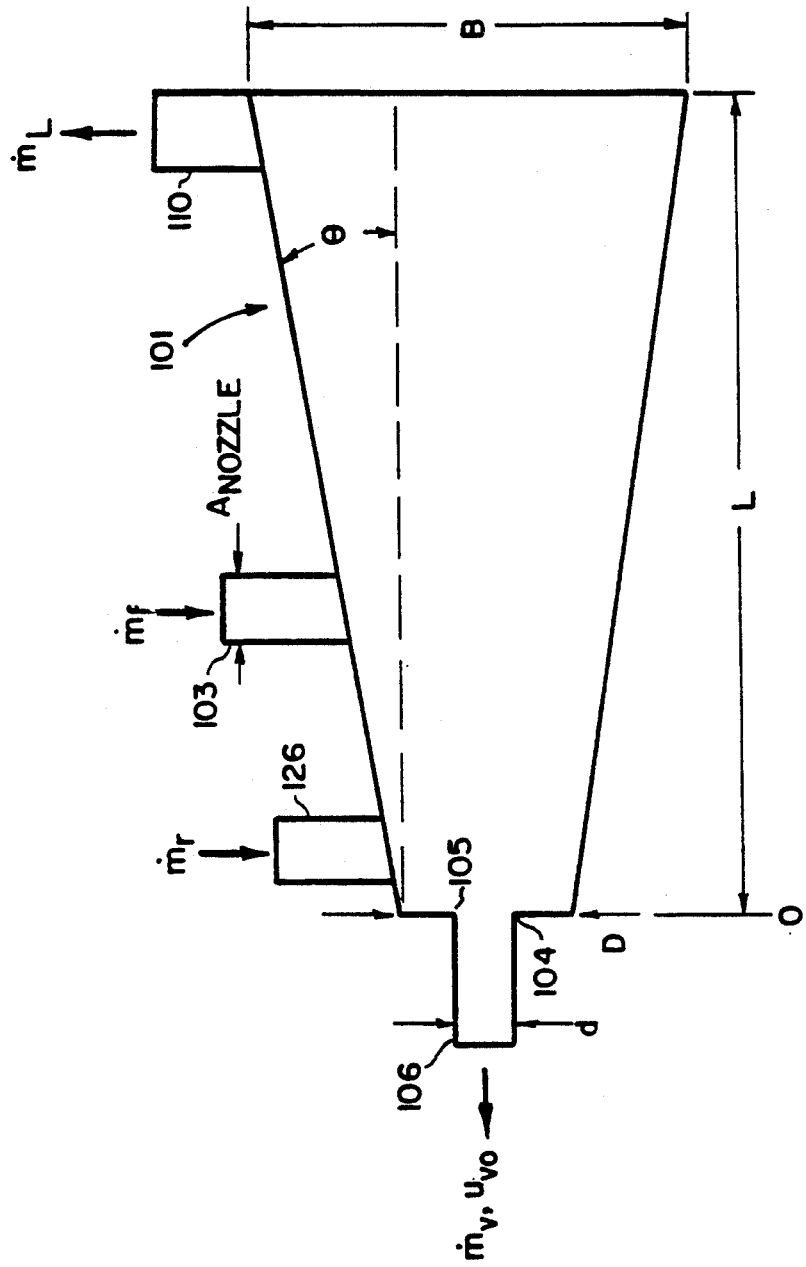
FIG. 2 is a schematic view of a single vortex tube denoting the major geometric dimensions thereof and the chief inlet and outlet flow stream parameters.

For purposes of vortex tube sizing and capacity, FIG. 2 illustrates the pertinent mass flow rates (geometric dimensions) which must be analyzed.

A = area of inlet nozzle (defined at the nozzle exit nozzle): ft² nozzle
B = diameter at large end of the tube: ft
d = diameter of vapor outlet orifice: ft
D = diameter at small end of the tube: ft
L = tube length: ft
$\dot{m}_f$ = air feed rate: lb/sec
$\dot{m}_f$ = recycle liquid feed rate: lb/sec
$\dot{m}_L$ = liquid oxygen product rate: lb/sec
$\dot{m}_v$ = vapor product rate: lb/sec
$U_{vo}$ = vapor velocity at the vapor outlet: ft/sec
$\theta$ = angle between tube wall and a line parallel to the tube axis: degrees The tube wall area is calculated from:

$$A_w = \frac{\pi}{\cos\theta} \cdot \frac{D+B}{(2)} L \text{ and}$$

The vapor outlet velocity is given by:

$$U_{vo} = \dot{m}_v / \frac{\pi}{4} d^2 \rho_{vo}$$

where $\rho_{vo}$ is the vapor density in lb/ft³ at axial outlet diameter d.

On estimating throughput to volume relationships, the base case for vortex tube is derived from the data of Table I, which stems from the design parameters of U.S. Pat. No. 4,531,371. Table I lists the physical and mass properties assumed for the simplified thermodynamics of the mathematical model of the vortex tube air separator.

TABLE I

| Physical Properties for PC Model of Vortex Tube Air Separator | |
|---|---|
| Heat of Vaporization (λ): Btu/lb-mole | 2500 |
| Heat Capacity ($C_p$): Btu/lb mol-°R | 7 |
| Base Temperature ($T_b$): °R | 180 |
| Base Pressure ($P_b$): atm | 5.44 |
| Relative Volatility (α): $\alpha = \exp(3.46529 - 4.924127/p^{0.0662})$ | |

Evaluating the published recommendation for the relationship between the optimum inlet nozzle area and the tube diameter, this relationship is:

$$A_{nozzle,opt} = \frac{0.15}{(p_r - 1)^{0.5}} \cdot \frac{D^2}{4}$$

or, for an inlet to outlet pressure ratios, $p_r$, of 6, then:

$$A_{nozzle,opt} = 0.0527 D^2.$$

From our computer model, a 6:1 pressure ratio starting at 90 psia implies inlet nozzle exit conditions of 30 psia, $\theta_v = 0.55$ lb/ft³, $U_v = 610$ ft/sec. Then, for 550 lb/hr of vapor, plus some liquid which will not contribute appreciably to the volumetric flow, $A_{nozzle,opt}$ should be about 0.00046 ft². This corresponds to a D = 0.093 ft.

Consider next the velocity at the gas outlet. At 15 psia and saturation, the outlet nitrogen density is about 0.29 lb/ft³. The published data indicates that the diameter of the outlet orifice, d, lies in the range d/D = 0.35 to 0.55. Again assuming 550 lb/hr flow, the outlet velocity is between 222 and 548 ft/sec., if D = 0.1 ft. The higher end of this range seems somewhat unreasonable (too high a Mach number), but the lower end, 220 ft/sec, is reasonable.

Our conclusion is that a D of 0.1 ft, and an L/D of 20, give the minimum internal volume for a vortex tube producing 550 lb/hr of saturated nitrogen vapor product at one atmosphere pressure (see Table II).

In the present invention, for the hypersonic aircraft application, liquid hydrogen is available as a refrigerant. The use of this refrigeration eliminates the need for compression of the feed air above the level needed to operate the vortex tube itself.

Moreover, we have determined that vortex tube purity/recovery performance should be greatly enhanced by providing as much of the refrigeration, as possible, by condensing and returning liquid from the product nitrogen stream, rather than by partially condensing the feed air as taught in the art. This is shown in the present overall flow sheet of FIG. 3.

Air is cooled to saturation (or partially condensed) against the onboard hydrogen fuel and the returning nitrogen-rich stream. The cooled air is fed to the vortex tube through a tangential inlet nozzle located at some distance from the vapor outlet end of the tube. Nitrogen-rich vapor from the cold end of the tube is split into two streams. One of these streams is withdrawn as product, while the lesser is totally condensed and pumped back to the cold end of the tube as reflux.

To be more specific: ambient air feed stream 113 (compressed) passes through heat exchange means 114 wherein it is cooled and flows via line 115 directly to the standard inlet 103 of a vortex tube separator 101. Note that the tangential entry point is laterally offset an appreciable length from the cold end 104, thereby defining one end of the functional rectification section, to be described. Liquid hydrogen stream 116 enters the low temperature side of exchanger 114, serving as a refrigerant for the inlet compressed air, and passes via line 117 to a para-ortho converter 118, from whence it repasses via line 119 back through exchanger 114, exiting as a warmed hydrogen stream 120.

Separator 101 produces two streams, the desired oxygen-enriched stream 110 at the so-called "warm end", and a nitrogen-rich vapor axial stream at the so-called "cold end" of the tube. Stream 118 is then split with a major portion of it passing via line 121 back through the exchanger 114, then being vented, or recovered. Concurrently, a minor percentage of the vapor stream 118 is also cycled to the exchanger 114 via line 122 for partial cooling, and thence via return line 123 to a compressor 124, which condenses the cooled nitrogen-rich stream and passes same via line 125 back to separator 101, also entering it tangentially but through a separate inlet 126. This entry point is offset markedly from inlet 103, but is proximal to tube cold end 104. Consequently, the two feed streams of compressed air and liquid hydrogen are processed into three streams of: warm hydrogen 120; a nitrogen-enriched gas 121; and a highly enriched liquid oxygen stream 110, the latter being the premier product of this process.

Condensing nitrogen requires refrigeration at a colder temperature than does condensing air, due to the lower oxygen content of the condensate and to the much lower pressure. This limits the amount of nitrogen which can be condensed without increasing the hydrogen flow. From the refrigeration point of view, it is advantageous to produce the condensed nitrogen at the highest possible pressure; unfortunately, increasing the nitrogen product (121) outlet pressure tends to reduce oxygen recovery, as is discussed later.

Figure 4:
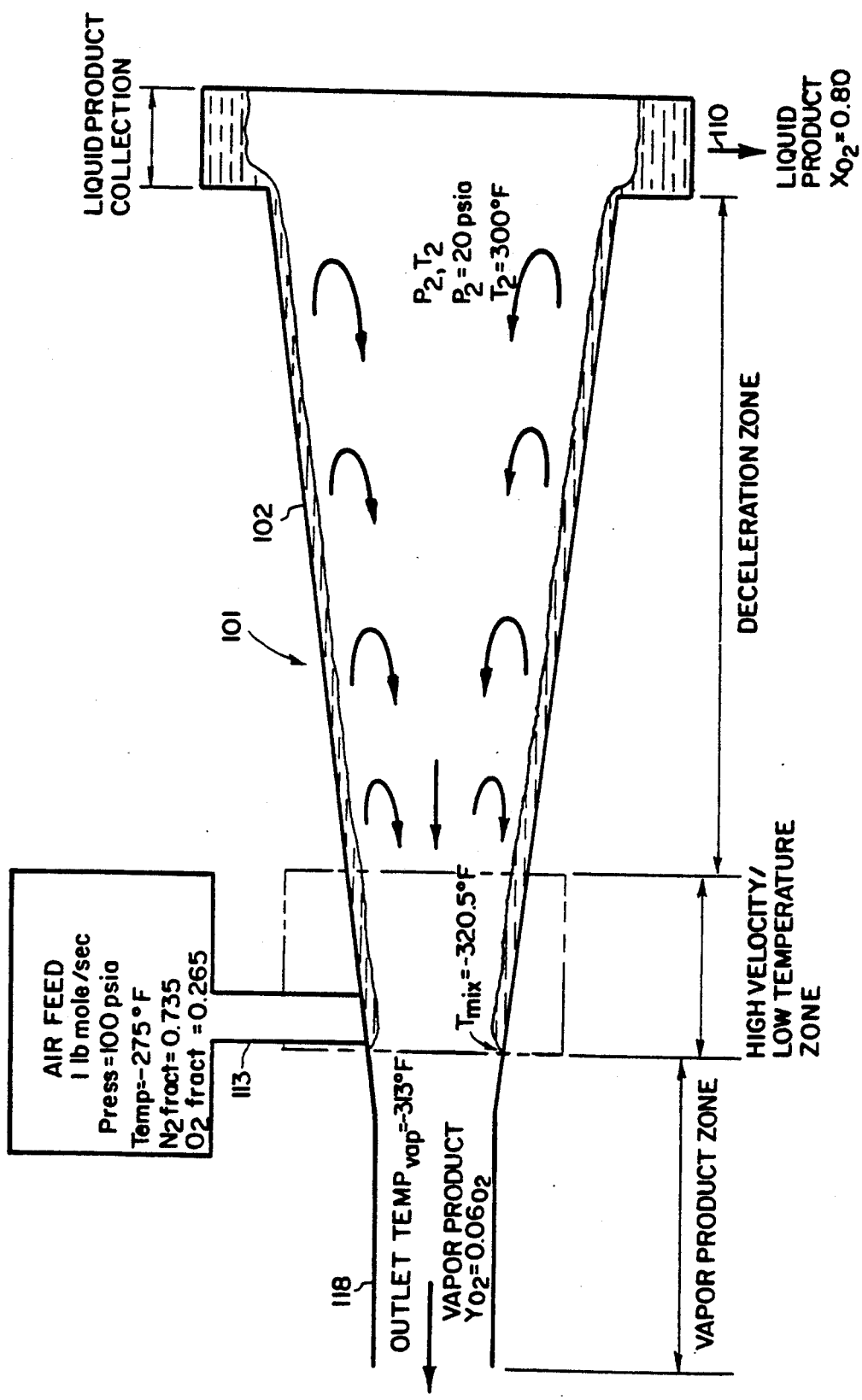
FIG. 4 is a schematic flow sheet of a two-phase vortex tube consistent with the prior art, and annotated to show representative operating temperatures and material balances, which is useful to describe these improvements.

An approximate material and pressure balance is shown in the schematic view of FIG. 4 for this two-phase vortex tube. Overall, a system air feed of one lb-mole per second will yield about a 13:1 split of the contained incoming oxygen in the feed, with the great bulk of $O_2$ exiting the system as an oxygen-enriched product 110, not coincidentally being of greater stream purity.

Figure 5:
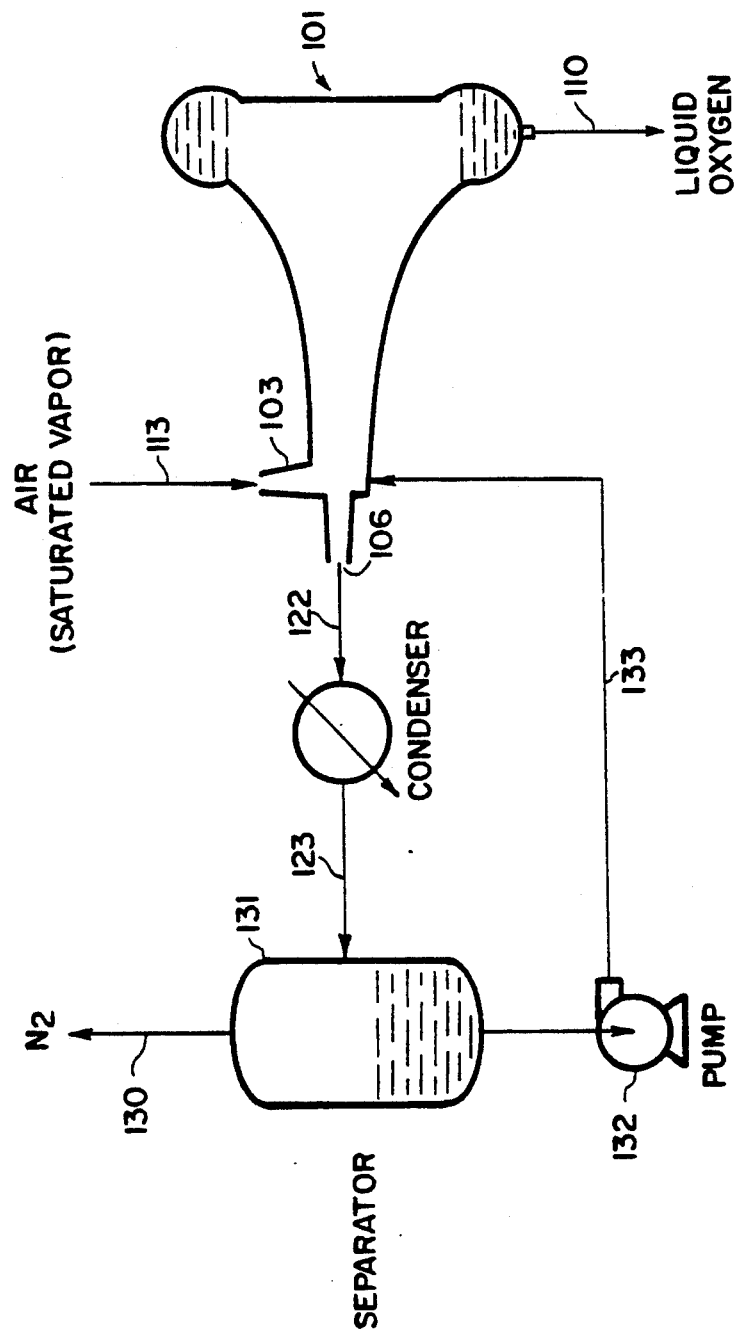
FIG. 5 is a schematic flow diagram of an isolated system for refrigeration and recycle of the nitrogen-rich vapor co-product to the vortex tube of this invention.

FIG. 5 shows one schematic process for providing refrigeration by condensing nitrogen outside of the cold end of the vortex tube. Our mathematical model indicates that vapor/liquid equilibrium constraints at the vapor outlet end 104 of the VT are a major limit on the purity of the nitrogen-rich vapor product. The scheme depicted directly creates a higher purity nitrogen product stream 130, and thus improves oxygen recovery at the header 108 of the separator 101. The refrigeration duty is basically the same as for air feed partial condensation step of the prior art; but here, it must be supplied at a lower temperature. Consequently, an external separator 131 and a condensate pump 132 are needed to recycle liquid refrigerant via line 133 to separator 101.

Figure 3:
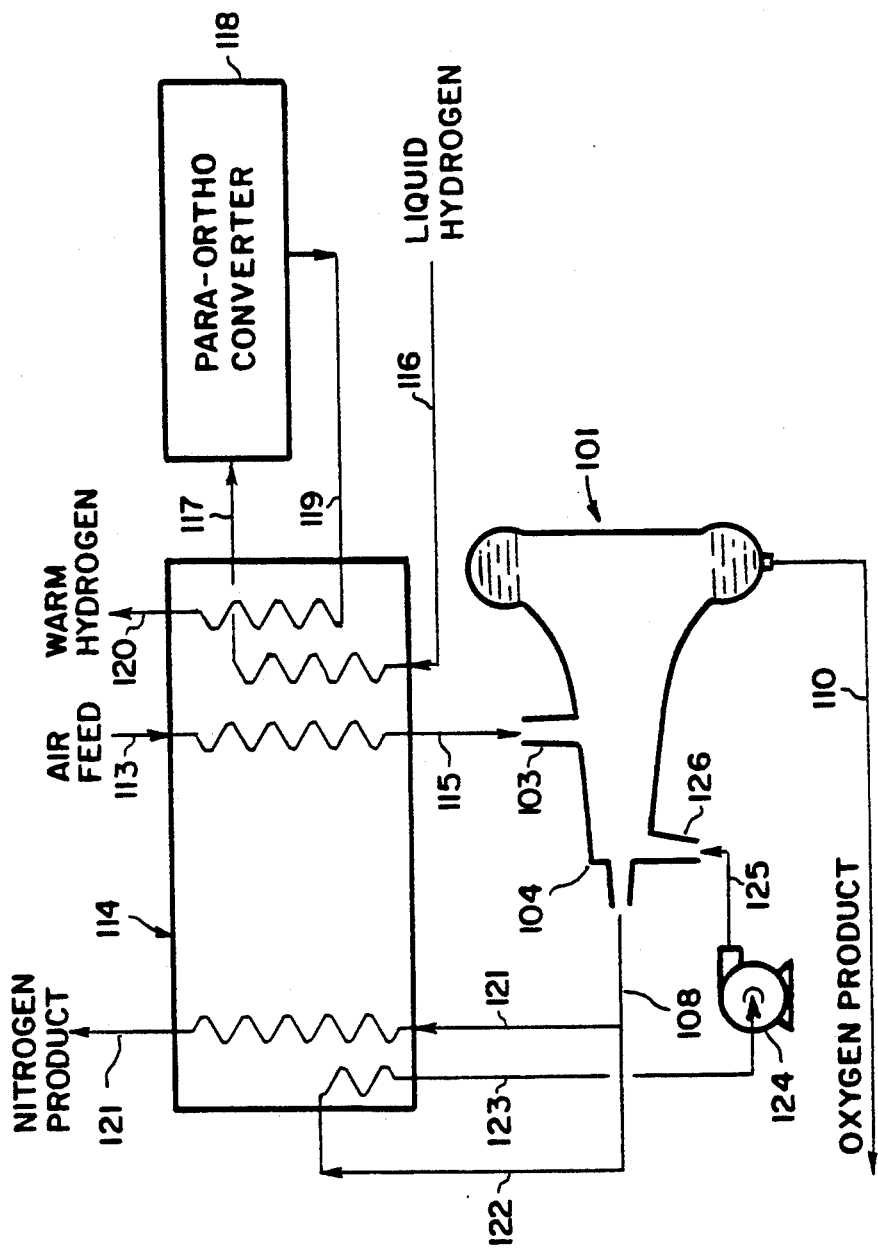
FIG. 3 is a schematic flow diagram of the major equipment components and flow streams incorporating the present invention, which utilization as refrigeration source may be most appropriate for a hypersonic aircraft.
Figure 6:
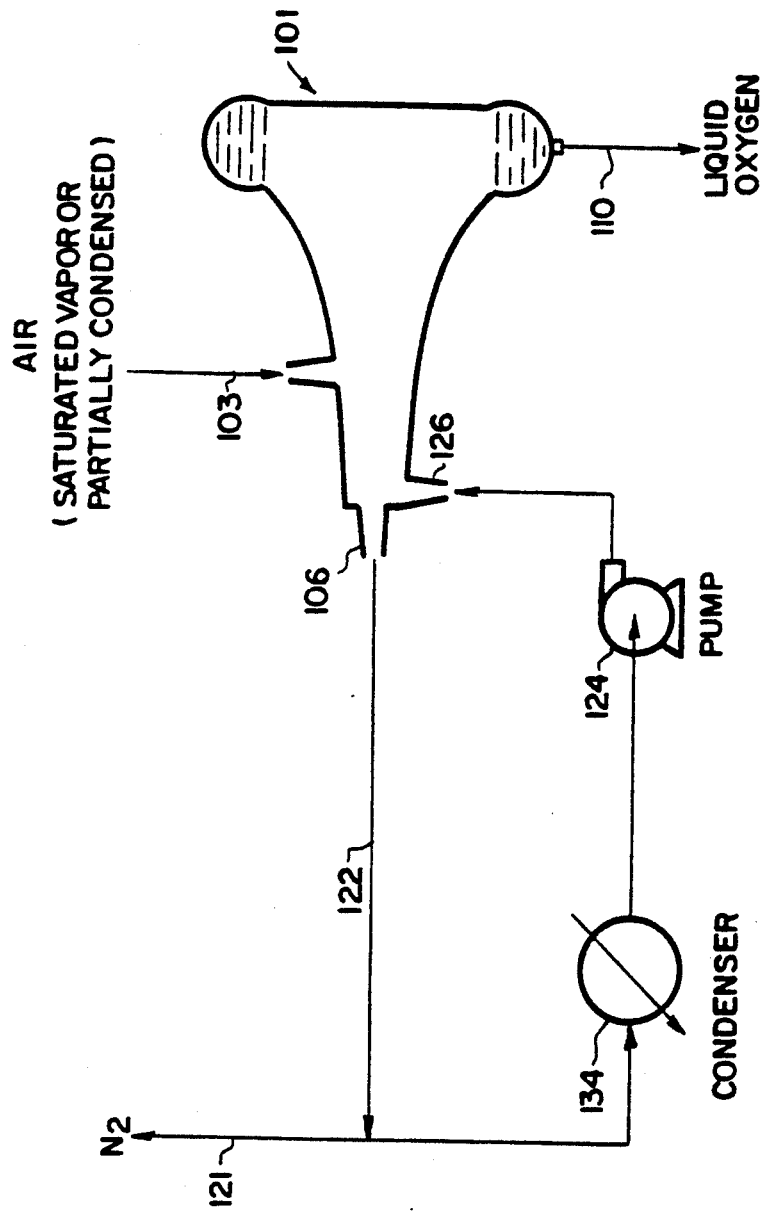
FIG. 6 is a schematic view illustrating the rectification section within the tube.

The schematic view of FIG. 6 is a break-away of the general schematic of FIG. 3, and it focuses on cold-end condensation adapted to serving as an internal rectification section. As in the mentioned FIG. 3, the nitrogen-rich vapor product stream 122 is split, with a minor portion passing through a condenser 134 and pump 124 for total condensation, then entering proximal to the gas outlet 126 of the VT separator. The achievement of proper vapor and liquid flows in rectification zone 135 is within the skill of the art. If heat and mass transfer rates are made comparable to those in a "conventional" vortex tube, the modified tube can exceed the performance of the VT with external cold-end separator configuration of FIG. 5.

Our vortex tube mathematical model shows the excellent performance that can be calculated when employing a rectification zone, even without including any enhanced surface effect for the VT, to be described. Such improved performance (oxygen recovery/purity) is gained by having a reflux flow of condensed nitrogen providing a liquid film (in the liquid sense) upstream in the compressed air feed entry point 103 (FIG. 1). The liquid film flow (FIG. 1) would be increased by any condensate entering from the air feed.

Figure 7:
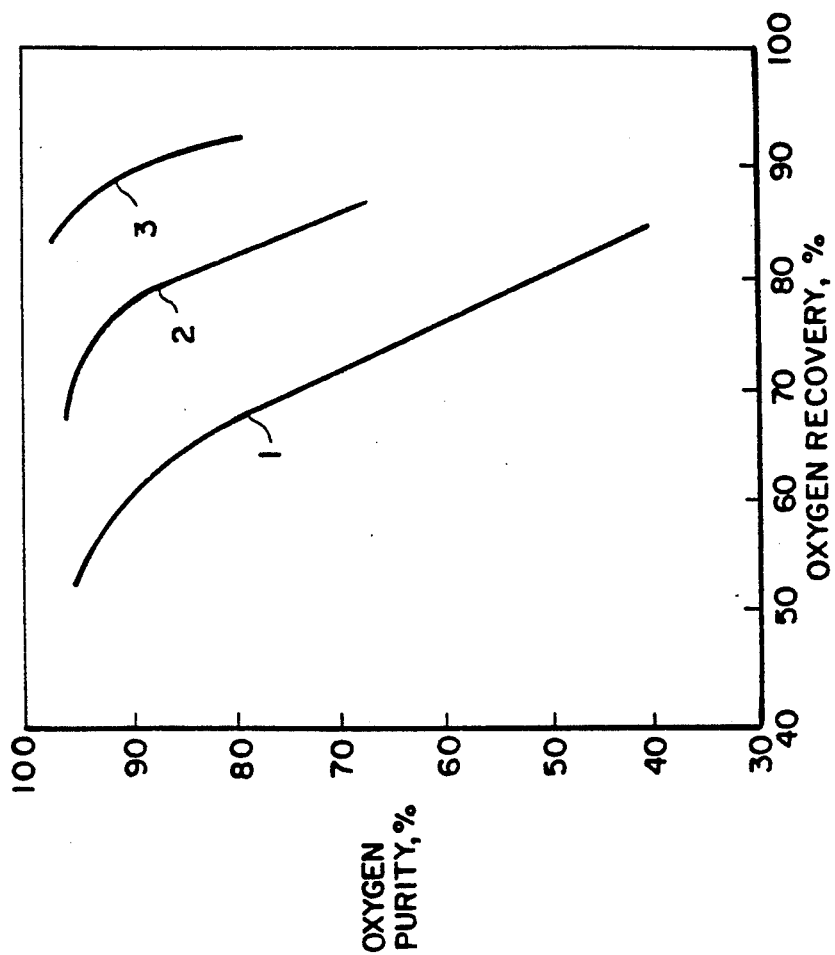
FIG. 7 is a plot of oxygen purity vs. oxygen recovery of a vortex tube mathematical model, depicting comparative performance with the prior art for the two of the embodiments of the invention.

The curves of the FIG. 7 show the contrasts in improvements between the single, external separation stage of FIG. 5, and the internal rectification zone 135 of FIG. 6. The base case (curve 1) is for $O_2$ yields without the inclusion of either of the teachings of the present invention. Curve 2 shows the yields for the base case vortex plus cold end condensation using a single external separation stage. Curve 3 shows the yields for the base case vortex plus cold end condensation using an internal rectification stage. For all three curves there is no surface enhancement, i.e. $\beta/\beta_o = 1$.

Figure 8A:
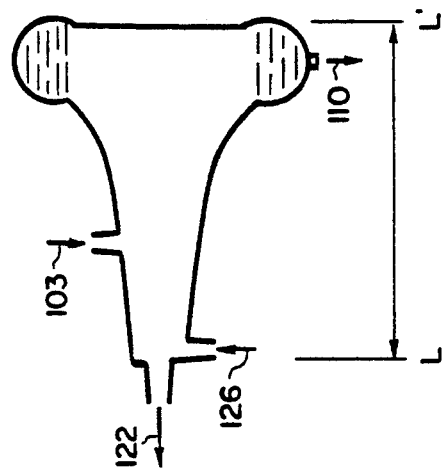
Figure 8B:
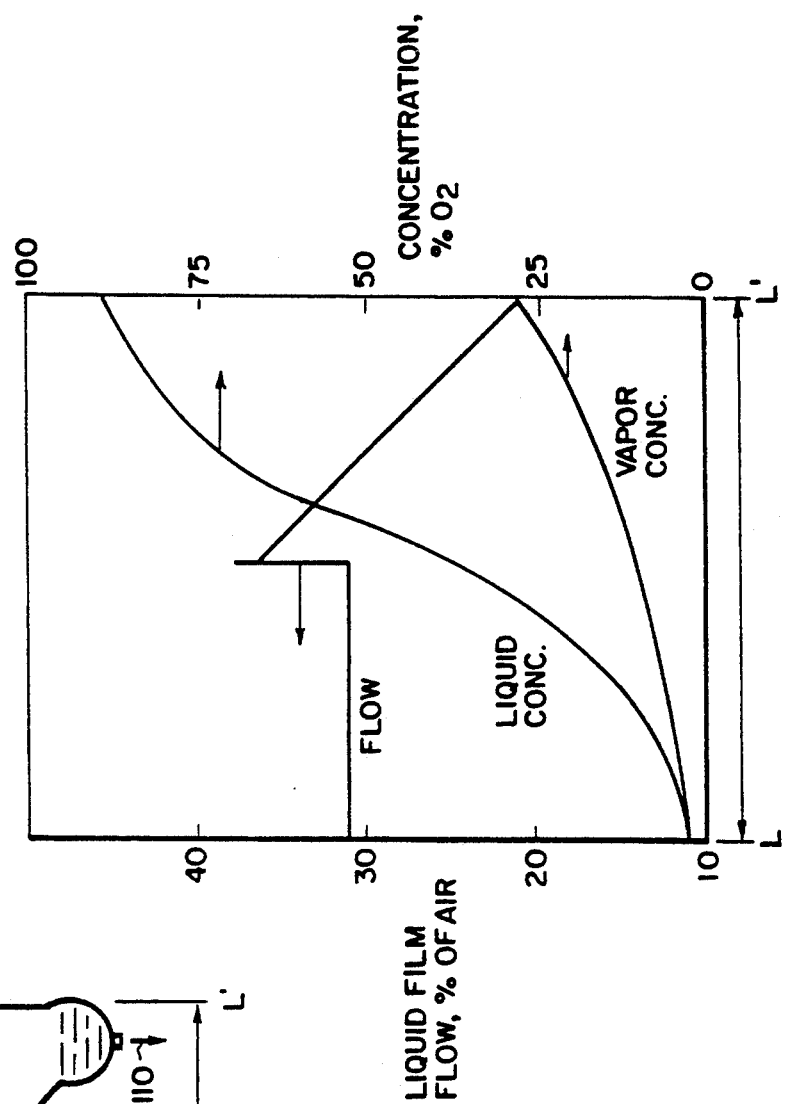

The oxygen concentration in the liquid film of the rectification zone 135 will span the range from a few percent to a value broadly in equilibrium with the air feed, as shown in FIG. 8b. For convenience, FIG. 8a is shown to illustrate the shown length of vortex tube 101. The remaining change of oxygen concentration up to ninety percent, or even higher, will occur in the "conventional", or "warm-end," (L')section of the VT. The overall tube L/D (FIG. 2) should be kept at about 20:1, with about half of the tube length being devoted to the rectification function.

Figure 9:
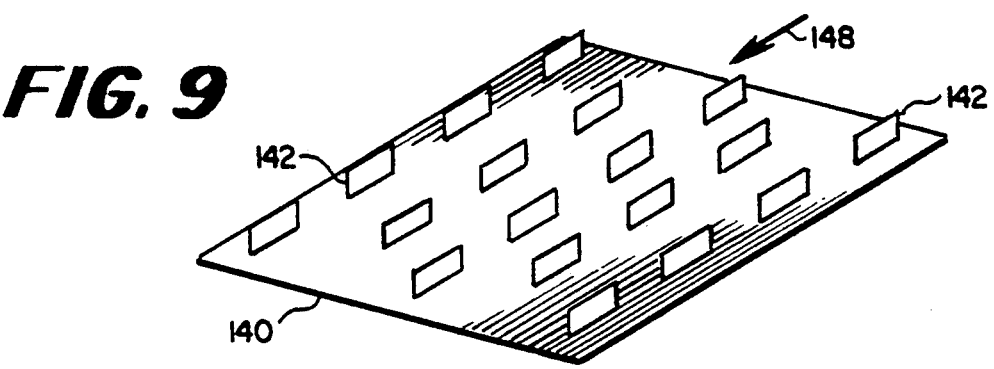
FIG. 9 is a schematic view of a first embodiment of an array of fins adapted for providing extended surface area at the film/wall interface, which results in an increase in liquid/vapor interfacial area.

In another principal embodiment of the invention, the oxygen purity-recovery performance is improved by enhancing the sensible heat transfer effected between nitrogen-enriched gas stream and the liquid oxygen-enriched film flowing along the periphery of the VT wall. Such enhancement takes the form of specially configured tube wall surfaces, the first form of which is shown in FIG. 9. (In this perspective view, the normally curvilinear tube side walls 140 are seen flattened for illustrative purposes.)

Tube wall 140 is provided with a multiple array 141 of substantially perpendicular fins 142, disposed along an extended sector thereof. The fins 142 are integral to the wall, and are preferably arranged in essentially linear rows (this is optional), but with each row also aligned coincident with the annular flow direction of the liquid film, thus fostering laminar flow in this region of the tube.

Such added elements afford higher heat and mass transfer rates between gas and liquid flowing at high angular velocities near the tube wall. The fins are conveniently of a curvilinear periphery. It will be evident that heat transfer, as measured by the UA factor, with "U" representing the heat transfer coefficient of the wall section, and "A" representing the overall surface area of the wall section, will be increased.

Figure 10:
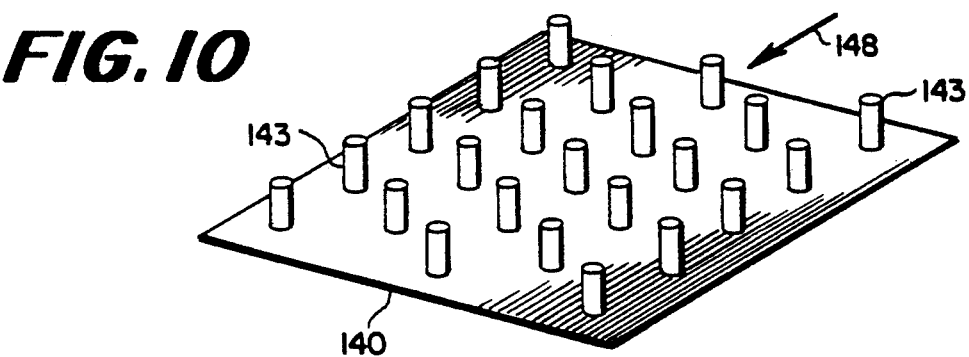
FIG. 10 is a schematic of a second embodiment of arrayed pin-like protrusions adapted for providing extended surface area and effecting like results.

In another embodiment, which also enlarges the "A" component of the "UA" heat transfer factor, tube wall 140 is provided with a multiple array of substantially perpendicular cylindrical pins 143 disposed along an extended sector thereof (FIG. 10). Like the planar fins 142 of the final embodiment, these pins 143 are integral to the tube wall and are preferably arranged in essentially linear rows, with each row aligned coincident with the annular flow direction of the liquid film. Such projections similarly offer higher heat and mass transfer rates between swirling gas and liquid. Their utility will be evident by the increase in the A component of the "UA" factor. Both fins and pins are fabricated from a metal that is highly heat conductive and can withstand the extreme cold temperatures of the VT environment, without undue metal embrittlement.

Figure 11:
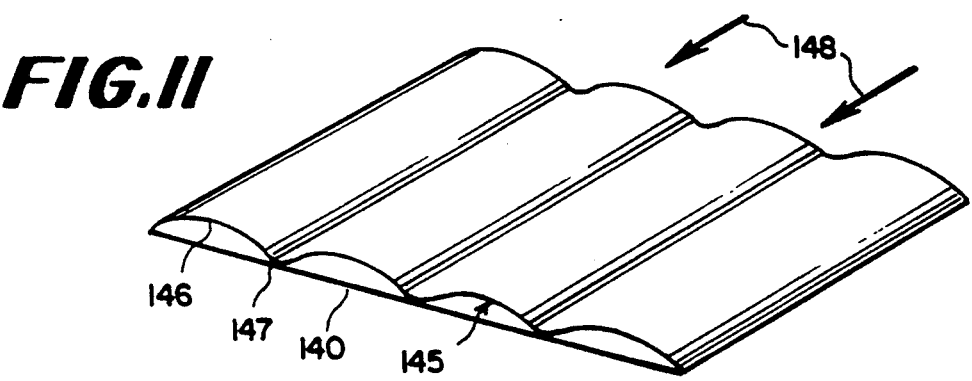
FIG. 11 is a schematic of a third embodiment showing surface perturbations in the vortex tube inner wall, serving to increase turbulence within the liquid film and enhancing the heat transfer coefficient.

Another embodiment of the tube surface is depicted in FIG. 11, also going to an enhanced UA factor which serves by increasing liquid film turbulence over the VT wall. This is accomplished by incorporation of wall surface perturbations. Wall 140 is normally provided with a non-planar configuration generally curvilinear, characterized by substantially regular undulations 145 in the wall surface. Such undulations each present alternating adjacent crests 146 and troughs 147, appearing visually much like the surface of the antiquated washboard. The linear aspect of the crest/troughs are coincidental with the flow direction 148 of the peripherally moving liquid (not seen).

Figure 12:
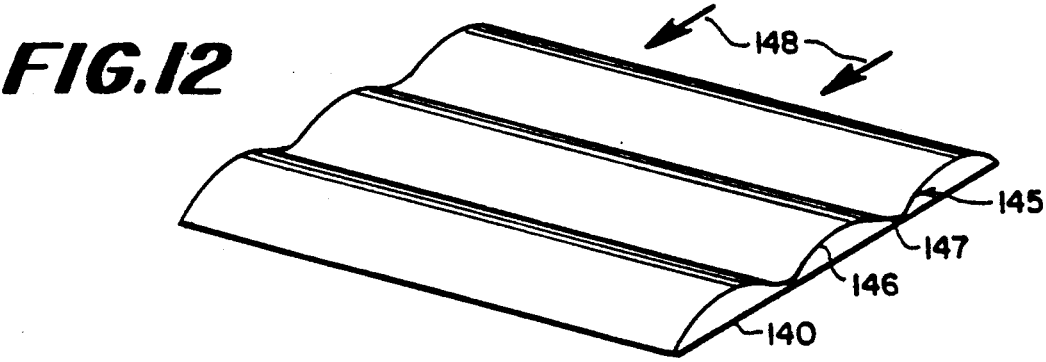
FIG. 12 is a schematic of a fourth embodiment showing differently aligned surface undulations in the VT inner wall, serving for increasing the liquid turbulence just described.

In another embodiment (FIG. 12), the identical "washboard" surfaces have been rotated 90°, so that their linear aspects 146/147 are aligned perpendicular to the flow direction 148 of the moving liquid (not shown). There are sheet-like metals known to the art, of sufficient malleability to be conformed to the described wall surface configurations for each of these two embodiments.

One means to summarize the enhanced performance for the vortex walls is the surface enhancement factor $\beta/\beta_o$. For the prior art, this value is 1, and performance is calculated by fitting the published data for the prior art vortex tube air separator (see Table II).

Figure 13:
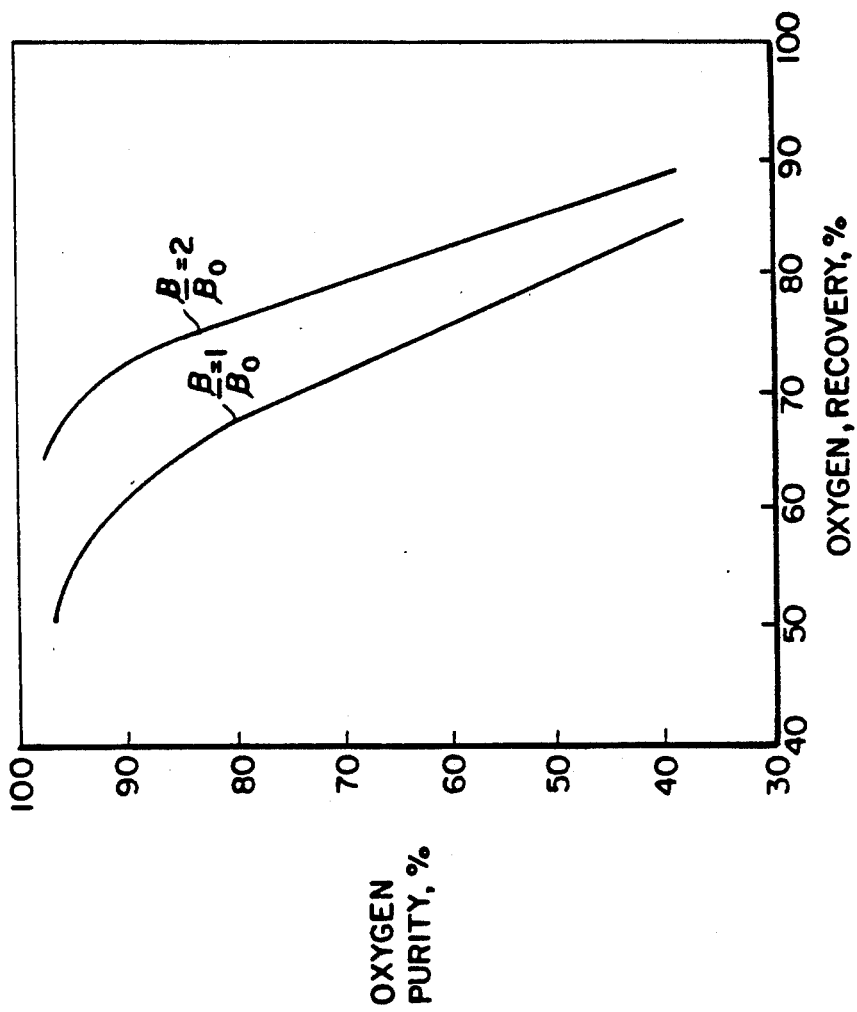
FIG. 13 is a plot of oxygen purity vs. oxygen recovery demonstrating the improvement in performance resulting from enhancing the heat and mass transport by a factor of two (surface enhancement factor) using concepts as exemplified in FIGS. 9-12.

$\beta/\beta_o$ is changed from unity by using designs illustrated in FIGS. 9 to 12. For example, FIG. 13 depicts the effect on oxygen yield of doubling of the surface enhancement factor. Note that the O₂ recovery improvement is appreciable, as the factor is doubled.

By employing the cold-end condensation approaches of the present invention, marked improvements in VT separation are foreseen. This impact is illustrated in FIG. 7. In FIG. 14, both cold-end condensation and surface enhancement are incorporated, demonstrating substantial performance improvement. In FIG. 14, curve 1 is the base case, curves 2–4 are for the base case vortex plus cold end condensation using a single stage external separator. Curves 2–4 differ in the amount of surface enhancement. In curves 2–4, the surface enhancement factor $\beta/\beta_o$ is varied at 1, 2, 3, respectively. Note that at the highest factors, oxygen liquid purity and recovery in the separation system can be expected to exceed ninety percent.

The prior art has generated approximate external dimensions for vortex tube air separators, which provide the basis for the earlier calculations for starting the present design; these dimensions are listed in Table II. Table II has been amended to add a fourth data line, reflecting our calculation of the minimum internal volume for a VT at this capacity level of saturate nitrogen vapor products at one atmosphere.

TABLE II

Approximate External Dimensions of Vortex Tube Air Separators for Apparatus of U.S. Pat. No. 4,531,371

| Capacity (Nitrogen Product) | | D Diameter: | L Length: | $\frac{L}{D}$ | $\frac{m_y}{D^2}$ |
|---|---|---|---|---|---|
| scfh | lb/hr | ft | ft | D | lb/ft² hr |
| 7600 | 550 | 0.5 | 2.0 | 4.0 | 2200 |
| 19000 | 1380 | 0.75 | 3.3 | 4.4 | 2400 |
| 39000 | 2750 | 1.08 | 4.6 | 4.3 | 2350 |
| 7600 | 550 | 0.1 (new) | 2.0 | 20 | 2200 |

Table III compares a temperature and liquid fractions at the nozzle exit, calculated by the simplified model with the results of exact thermodynamic results from an in-house process simulator for air separation systems. The simplified model matches the temperatures and liquid compositions reasonably well. It correctly predicts the amount of liquid formed by the expansion in the low pressure case, but under predicts these values as pressure increases.

TABLE III

Operating Parameters for Isentropic Two-Phase Expansions At Inlet Nozzle

| | Low Pressure Case | | Inlet Nozzle High Pressure Case | | Internal Expansion | |
|---|---|---|---|---|---|---|
| | PC | Exact | PC | Exact | PC | Exact |
| Specified | | | | | | |
| Upstream Pressure: atm | 6 | 6 | 14 | 14 | 4.2 | 4.2 |
| Downstream Pressure: atm | 2.1 | 2.1 | 5.3 | 5.3 | 2.0 | 2.0 |
| Upstream Liq Fraction | 0.32 | 0.32 | 0.07 | 0.07 | 0.0 | 0.0 |
| O₂ Mole Fract in Total Feed | 0.21 | 0.21 | 0.21 | 0.21 | 0.068 | 0.068 |
| Calculated | | | | | | |
| Upstream Temp: R | 183 | 180 | 208 | 205 | 174 | 172 |
| Downstream Temp: R | 159 | 157 | 180 | 178 | 157 | 157 |
| Temp Difference: R | 24 | 23 | 28 | 27 | 17 | 15 |
| Downstream Liq Fraction | 0.35 | 0.34 | 0.12 | 0.17 | 0.05 | 0.06 |
| Mole Fraction O₂ in Downstream Liquid | 0.35 | 0.35 | 0.37 | 0.36 | 0.38 | 0.37 |

As to tube wall velocity, such velocities predicted for two cases (inlet/outlet pressure ratio) are listed on Table IV. The first case is of particular interest, since it corresponds to the basic prior art design condition of a 6:1 pressure ratio, with an outlet pressure of 1 atm. The velocity at the exit from the feed ($U_{nozzle}$ in this case) is expected to be about Mach 1, or 610 ft/sec; the value predicted by the simple mathematical model is 634 ft/sec.

TABLE IV

Calculated Wall Velocities for Two Pressure Ratios

| | Low Pressure Case | High Pressure Case |
|---|---|---|
| Specified | | |
| Inlet Pressure ($p_i$): atm | 6 | 14 |
| Outlet Pressure ($p_o$): atm | 1 | 2 |
| Inlet Liquid Fraction | 0.316 | 0.070 |
| Calculated | | |
| Wall pressure ($p_a$): atm | 2.3 | 5.6 |
| Angular velocity at wall ($u_a$): ft/sec | 634 | 757 |

The improvement predicted by our vortex model are further illustrated by the following examples.

WORKING EXAMPLE I

In this example, air at 6 atm absolute pressure is cooled to approximately its dew point and fed to the inlet nozzle of a vortex tube. Liquid product is withdrawn and sent to storage as for the tube of the prior art. The vapor product is withdrawn and the liquid nitrogen returned as shown by FIG. 3. The recycle liquid could be injected through a central perforated tube, or preferably tangentially on the tube wall. The resulting improvement in performance, as predicted by our model, as is shown by curve #2 of FIG. 7. In this example, all of the refrigeration needed for producing the net liquid oxygen product 110 from the saturated vapor (air) feed is provided by the nitrogen condenser.

A further improvement in the vortex tube performance may be achieved by using a multistage condenser.

WORKING EXAMPLE II

As an alternative to, or in addition to, employing an external separator (FIG. 3) the tube itself may be used as a vapor-liquid separator, and/or the recycled liquid can be used in a manner analogous to the reflux flow at the top of a distillation column. These improvements could be realized by putting a rectification section downstream (in the direction of net vapor flow) of the inlet nozzle, as shown schematically by FIG. 6. In such section 135, the nitrogen being removed from the tube is further depleted in oxygen by heat and mass transfer with the nitrogen-rich recycle stream.

The predicted performance for a case where the rectification section occupies one-half of the tube is shown as curve #3 of FIG. 7. When using a rectification section, all or part of the refrigeration might be supplied by a cooling jacket on the wall of the vortex tube itself, thereby reducing or eliminating the need for a separate external condenser.

WORKING EXAMPLE III

Air at 6 atm. absolute pressure is cooled into the two-phase region of the vortex tube, being fed to the inlet nozzle 103 (FIG. 5). The wall of the tube has been physically modified so as to provide twice the heat transfer rate "UA". (See the alternatives of FIGS. 9 to 12.)

The improvement in performance ($O_2$ purity and/or $O_2$ recovery) according to the mathematical model, is shown by the curves of FIG. 13. The base case tube is where $\beta/\beta_o = 1$, and the enhanced surface tube is where $\beta/\beta_o = 2$.

The present invention has been described with reference to several specific embodiments thereof. These embodiments should not be viewed as a limitation on the scope of the present invention, such scope should be ascertained by the following claims.

We claim:

1. A process for separating air into a nitrogen-rich gas stream and an oxygen-enriched liquid stream by introducing partially condensed compressed air at a pressure of 3 to 30 atm (304 to 3,040 kPa(absolute)) and at a temperature in the range of 160° to 230° R (−184° to −146° C.) into a vortex tube for distillation, wherein the vortex tube has an entry point for the introduction of the partially condensed compressed air, a vapor outlet for the removal of the nitrogen-rich gas stream and a liquid outlet for the removal of the oxygen-enriched liquid stream; the entry point is located at an intermediate location along the length of the vortex tube between the vapor outlet and the liquid outlet, thereby defining a cold end section between the end point and the vapor outlet and a warm end section between the entry point and the liquid outlet, characterized by refrigerating the cold end section of the vortex tube, thereby reducing the energy requirement of the partially condensed, compressed air, resulting in less oxygen exiting the vortex tube in the nitrogen-rich gas stream and more oxygen exiting the vortex tube in the oxygen-rich liquid stream.

2. The process of claim 1 whereby the refrigeration for the cold end section is provided from a source external to the vortex tube.

3. The process of claim 2 wherein a portion of the nitrogen-rich gas stream is condensed and recycled for introduction as a liquid into the cold end section of the vortex tube, providing the refrigeration effect therein.

4. The process of claim 3 wherein an internal rectification section is provided in the cold end section of said vortex tube, such rectification section being defined by the lateral space provided between the entry point of the partially condensed compressed air and the separate entry point of the condensed nitrogen-rich effluent stream being recycled to the vortex tube said rectification section enhances the oxygen purity of the oxygen-enriched liquid stream flowing from the cold end section of said vortex tube.

5. The process of claim 1 wherein the partially condensed compressed air is from 0 to 40 percent by weight liquid and the separator rectification is carried out in the vortex tube by thermal interchange with the condensed medium introduced at a temperature lower than the entry temperature of said compressed air.

6. The process of claim 2 wherein the cooling and condensing of the nitrogen-rich gas stream is provided by an external refrigeration source.

7. The process of claim 1 wherein compressed air is cooled and partially condensed by an ancillary source of liquid hydrogen in a heat exchanger having companion heat transfer zones.

8. The process of claim 1 wherein the ratio of the upstream pressure at the entry point to the downstream pressure at the vapor outlet ranges from 3 to 10.

9. The process of claim 1 wherein the liquid pressure along the vortex tube wall is in the range of 2 to 7 atmospheres.

10. The process of claim 3 wherein the angular velocity of the vapor near the vortex tube wall is in the range of 400 to 800 ft/sec.

11. An apparatus for providing an oxygen-enriched liquid stream and a nitrogen-enriched gas stream from a compressed and partially condensed air feed having a means for compressing air, a heat exchange means having a low pressure side and a high pressure side with each side having an inlet and outlet, an air separation means comprising a vortex tube having an air inlet in flow communication with the outlet of the high pressure side of said exchange means; an exit means for the nitrogen-rich gas stream in flow communication with the inlet of the low pressure side, and a diffuser for collecting the oxygen-enriched liquid stream, characterized by: enchanced, sensible heat transfer, internal surfaces in the vortex tube having a surface enhancement factor $\beta/\beta_o$ greater than 1.0.

12. The apparatus of claim 11 wherein at least a portion of the curvilinear wall of said vortex tube lying between the air inlet point and the oxygen-enriched liquid outlet point is provided with an array of internally projecting spiral fins, all of which are linearly and coincidental to the flow direction of the peripherally disposed liquid.

13. The apparatus of claim 11 wherein at least a portion of the curvilinear wall of said vortex tube lying between the air inlet point and the oxygen-enriched outlet point is provided with an array of internally projecting curvilinear pins, all of which are aligned linearly and coincidentally with the flow direction of the peripherally disposed liquid.

14. The apparatus of claim 11 wherein the curvlinear wall of said vortex tube lying between the air inlet point and the oxygen-enriched outlet point is provided with a non-planar surface characterized by substantially regular serial undulations in the wall surface, said undulations each presenting successive linear crests and troughs with the linear aspect of each of said crest being coincidental with the flow direction of the peripherally disposed moving liquid.

15. The apparatus of claim 11 wherein the curvilinear wall of said vortex tube lying between the air inlet point and the oxygen enriched outlet point is provided with a non-planar surface characterized by substantially regular, serial undulations in the wall surface, said undulations each presenting successive linear crests and troughs with the linear aspect of each of said trough being disposed approximately to the flow direction of the peripheral moving liquid.

16. The apparatus of claim 14 wherein said undulations in the tube wall may be described as presenting a washboard configuration.

17. The apparatus of claim 15 wherein said undulations in the tube wall may be described as presenting a washboard configuration.

18. The apparatus of claim 11 wherein the vortex tube has a cold end section located between the air inlet and the exit means for the nitrogen-rich gas stream and which further comprises a means for refrigerating the cold end section of the vortex tube.

* * * * *